(12) United States Patent
Attar et al.

(10) Patent No.: US 10,531,067 B2
(45) Date of Patent: Jan. 7, 2020

(54) ENHANCING SPATIAL RESOLUTION IN A STEREO CAMERA IMAGING SYSTEM

(71) Applicant: Apple Inc., Cupertino, CA (US)

(72) Inventors: Ziv Attar, Palo Alto, CA (US); Paul M. Hubel, Mountain View, CA (US); Ilana Volfin, Santa Clara, CA (US); Sebastien Marineau-Mes, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/936,275

(22) Filed: Mar. 26, 2018

(65) Prior Publication Data

US 2018/0278913 A1 Sep. 27, 2018

Related U.S. Application Data

(60) Provisional application No. 62/481,288, filed on Apr. 4, 2017, provisional application No. 62/476,845, filed on Mar. 26, 2017.

(51) Int. Cl.
*H04N 13/15* (2018.01)
*H04N 13/257* (2018.01)
(Continued)

(52) U.S. Cl.
CPC ......... *H04N 13/15* (2018.05); *H04N 5/23287* (2013.01); *H04N 9/045* (2013.01);
(Continued)

(58) Field of Classification Search
CPC ...... H04N 13/15; H04N 13/257; H04N 13/25; H04N 5/23287; H04N 9/045; H04N 9/43; H04N 9/78; H04N 2013/0077
See application file for complete search history.

(56) References Cited

U.S. PATENT DOCUMENTS 4,984,072 A 1/1991 Sandrew
5,648,817 A 7/1997 Aoki
(Continued)

FOREIGN PATENT DOCUMENTS

EP 1241896 A2 9/2002
EP 1912434 A1 4/2008
(Continued)

OTHER PUBLICATIONS

International Search Report received in corresponding PCT Application No. PCT/US2012/021946, dated Apr. 25, 2012.
(Continued)

*Primary Examiner* — John R Schnurr
(74) *Attorney, Agent, or Firm* — Blank Rome LLP

(57) ABSTRACT

Techniques are disclosed for capturing stereoscopic images using one or more high color density or "full color" image sensors and one or more low color density or "sparse color" image sensors. Low color density image sensors, may include substantially fewer color pixels than the sensor's total number of pixels, as well as fewer color pixels than the total number of color pixels on the full color image sensor. More particularly, the mostly-monochrome image captured by the low color density image sensor may be used to reduce noise and increase the spatial resolution of an imaging system's output image. In addition, the color pixels present in the low color density image sensor may be used to identify and fill in color pixel values, e.g., for regions occluded in the image captured using the full color image sensor. Optical Image Stabilization and/or split photodiodes may be employed on one or more sensors.

20 Claims, 9 Drawing Sheets
(3 of 9 Drawing Sheet(s) Filed in Color)

(51) Int. Cl.
  *H04N 5/232*  (2006.01)
  *H04N 9/43*   (2006.01)
  *H04N 9/78*   (2006.01)
  *H04N 9/04*   (2006.01)
  *H04N 13/25*  (2018.01)
  *H04N 13/00*  (2018.01)

(52) U.S. Cl.
  CPC ............... *H04N 9/43* (2013.01); *H04N 9/78* (2013.01); *H04N 13/25* (2018.05); *H04N 13/257* (2018.05); *H04N 2013/0077* (2013.01)

(56) References Cited

U.S. PATENT DOCUMENTS

| | | | |
|---|---|---|---|
| 5,760,832 | A | 6/1998 | Yamanaka |
| 6,373,523 | B1 | 4/2002 | Jang |
| 6,476,865 | B1 | 11/2002 | Gindele |
| 6,529,640 | B1 | 3/2003 | Utagawa |
| 6,611,289 | B1 | 8/2003 | Yu |
| 6,701,005 | B1 | 3/2004 | Nichani |
| 6,711,293 | B1 | 3/2004 | Lowe |
| 6,842,191 | B1 | 1/2005 | Smith |
| 6,847,396 | B1 | 1/2005 | Lin |
| 6,909,461 | B1 | 6/2005 | Gallagher |
| 7,102,686 | B1 | 9/2006 | Orimoto |
| 8,682,069 | B2 | 3/2014 | Hizume |
| 9,736,437 | B2 | 8/2017 | Kaiser |
| 2004/0264806 | A1 | 12/2004 | Herley |
| 2006/0125936 | A1* | 6/2006 | Gruhike ............... H04N 9/045 348/238 |
| 2007/0030611 | A1 | 2/2007 | Cho |
| 2007/0076269 | A1* | 4/2007 | Kido ............... H04N 5/23245 358/474 |
| 2007/0159640 | A1 | 7/2007 | Berestov |
| 2008/0024596 | A1 | 1/2008 | Li |
| 2008/0030611 | A1 | 2/2008 | Jenkins |
| 2008/0199069 | A1 | 8/2008 | Schick |
| 2008/0218611 | A1 | 9/2008 | Parulski |
| 2010/0073499 | A1 | 3/2010 | Gere |
| 2010/0157079 | A1 | 6/2010 | Atanassov |
| 2011/0012998 | A1 | 1/2011 | Pan |
| 2011/0074931 | A1 | 3/2011 | Bilbrey |
| 2011/0242286 | A1 | 10/2011 | Pace |
| 2011/0292258 | A1 | 12/2011 | Adler |
| 2012/0106840 | A1 | 5/2012 | Singhal |
| 2012/0188409 | A1* | 7/2012 | Gallagher ............... H04N 9/045 348/239 |
| 2013/0093855 | A1 | 4/2013 | Kang |
| 2014/0002612 | A1* | 1/2014 | Morioka ............... G03B 35/08 348/46 |
| 2019/0058869 | A1* | 2/2019 | Schmollgruber .... H04N 13/246 |

FOREIGN PATENT DOCUMENTS

| | | |
|---|---|---|
| WO | 9311631 A1 | 6/1993 |
| WO | 2006130734 A2 | 12/2006 |
| WO | 2007082289 A2 | 7/2007 |
| WO | 2009025959 A1 | 12/2008 |

OTHER PUBLICATIONS

PCT Search Report and Written Opinion received in corresponding PCT Application No. PCT/US2011/056497, dated Dec. 12, 2011.
Sivic et al, Video Google: A Text Retrieval Approach to Object Matching in Videos, ICCV 2003 1470-147.
International Search Report and Written Opinion received in Application No. PCT/US2018/024378, dated Aug. 21, 2018.
Chakrabarti, et al., "Rethinking Color Cameras," Pro. of the IEEE International Conference on Computational Photography, 2014.

* cited by examiner

ILLUSTRATIVE STEREOSCOPIC CAPTURE SYSTEMS

ENHANCING SPATIAL RESOLUTION IN A STEREO CAMERA IMAGING SYSTEM

BACKGROUND

This disclosure relates generally to stereoscopic imaging systems. More particularly, but not by way of limitation, this disclosure relates to techniques for generating an image from a multi-camera imaging system that generates color images with high spatial resolution and high color fidelity.

Current stereoscopic imaging systems may utilize two full color image sensors or one full color image sensor and one monochrome image sensor. Stereoscopic imaging systems using two full-color cameras can provide high color fidelity. This is true, even in occlusion areas of the captured images, because both cameras include color image data. For example, one camera can provide color image data, even if the other camera cannot for some part of the captured scene. In addition, by using two color cameras, image registration can use both luminance-to-luminance comparisons and chrominance-to-chrominance comparisons. As used herein, "luminance" refers to the intensity component of the light received by a particular pixel on an image sensor (i.e., a measure of how bright the pixel is, independent of its color). As used herein, "chrominance" refers to the intensity of a particular color component of light received by a particular pixel on an image sensor. It is also noted that, color image processing, e.g., due to color filter array effects, can reduce an image's spatial resolution and increase the image's noise, both of which may result in reduced quality in the final output image.

Stereoscopic imaging systems using one full color image sensor and one monochrome image sensor can use the resulting monochrome image as the reference image during registration operations and the full color image to add color to the monochrome image. This provides a higher spatial resolution image than the dual full color system, while still containing color values. The resulting image can, however, lack any color information in areas of the captured scene that are only visible to the monochrome image sensor. As a result, color in occluded areas may need to be determined by informed estimation, which leads to visible color artifacts in the resulting image. In addition, because the monochrome image sensor lacks chrominance values, image registration can only be performed using luminance-to-luminance comparisons.

SUMMARY

The following summary is included in order to provide a basic understanding of some aspects and features of the claimed subject matter. This summary is not an extensive overview and as such it is not intended to particularly identify key or critical elements of the claimed subject matter or to delineate the scope of the claimed subject matter. The sole purpose of this summary is to present some concepts of the claimed subject matter in a simplified form as a prelude to the more detailed description that is presented below.

In one embodiment, the disclosed concepts provide a method to generate an image by utilizing an imaging system having both a "high color density" image sensor (also referred to herein as a "full color" image sensor) and a "low color density" image sensor (also referred to herein as a "sparse color" image sensor). The method includes capturing a full color image of a scene from the high color density image sensor; capturing (concomitantly with the full color image) a low color density image of the scene from the low color density image sensor, wherein the low color density image sensor is configured to be in a predetermined spatial relationship with the full color image sensor in the camera device. The low color density image may include luminance pixels (also referred to herein as "monochrome pixels") having luminance values and color pixels having color values, wherein the number of luminance pixels on the low color density image sensor is greater than the number of color pixels on the low color density image sensor.

In some embodiments, the predetermined spatial relationship between the two image sensors is configured to allow for the stereoscopic capture of a scene. In some such embodiments, the two image sensors may thus have at least partially overlapping fields of view. In still other embodiments, while an initial spatial relationship between the image sensors may be known, the relative positioning of the two image sensors may change during the course of image capture, e.g., as caused by the use of one or more Optical Image Stabilization (OIS) systems in conjunction with one or more the image sensors, as will be described in greater detail below. In still other embodiments, split photodiode pixels may be used in conjunction with one or more of the image sensors, e.g., to provide power savings and improved low light auto focus performance.

Next, according to some embodiments, the method may generate reconstructed luminance values for each of the color pixels of the low color density image, e.g., using a luminance reconstruction circuit, and then generate a reconstructed luminance image, whose pixels correspond to pixels of the low color density image. In particular, the pixels of the reconstructed luminance image that correspond to the low color density image's luminance pixels may be set to the low color density image's corresponding luminance values, and the pixels of the reconstructed luminance image that correspond to the low color density image's color pixels may be set to the corresponding reconstructed luminance values.

Next, the method may generate reconstructed color values for each of the luminance pixels of the low color density image, e.g., using a color reconstruction circuit, and then generate a reconstructed color image, whose pixels correspond to pixels of the low color density image. In particular, the pixels of the reconstructed color image that correspond to the low color density image's color pixels may be set to the low color density image's corresponding color values, and the pixels of the reconstructed color image that correspond to the low color density image's luminance pixels may be set to the corresponding reconstructed color values.

Finally, e.g., using an output circuit, the method may merge the color information from the full color image and the reconstructed color image to generate an output image. In some embodiments, this process may be aided by using occlusion information associated with the full color image.

In some embodiments, the high color density image sensor may be an image sensor having more color pixels than the low color density image sensor within the same camera device. In other embodiments, the high color density image sensor may be defined as an image sensor having more than 50% color pixels, while the low color density image sensor has less than 50% color pixels. In still other embodiments, the high color density image sensor may be defined as having greater than or equal to a predetermined ratio of color pixels as compared to the lower color density image sensor, e.g., the high color density image sensor may have double, triple, quadruple, etc. the number of color pixels as the low color density image sensor. As may now be understood, in one exemplary embodiment, the low color density image sensor may include greater than approximately 3% but less than 50% color pixels, while the high color density image sensor includes greater than 50% color pixels (including up to 100% color pixels). In other embodiments, the low color density image sensor may include between approximately 8% and approximately 18% color pixels, while the high color density image sensor includes greater than 45% color pixels. In still other embodiments, the low color density image sensor may include as little as 1% color pixels.

In one embodiment, the color pixels of the low color density image sensor may be arranged in a regular pattern. In another embodiment, the color pixels of the low color density image sensor may be arranged in a pseudo-random pattern. In yet another embodiment, the color pixels of the low color density image sensor may be arranged in a row pattern or grid pattern. In still other embodiments, the method may include filtering, e.g., outlier filtering, of the output generated by the luminance restoration and/or color restoration circuits.

In one or more other embodiments, the various methods described herein may be embodied in computer executable program code and stored in a non-transitory storage device. In yet other embodiments, the described methods may be implemented in an electronic device having image capture capabilities.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
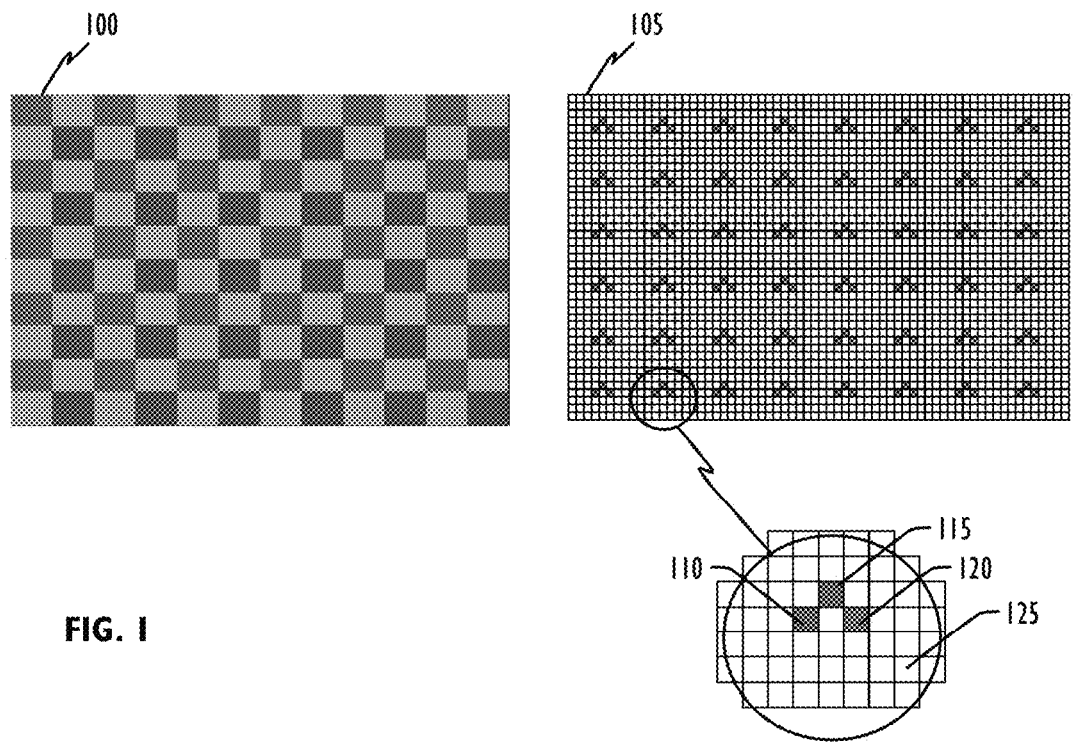
FIG. 1 shows a comparison between a conventional full color sensor and an exemplary low color density sensor, in accordance with one or more embodiments.

This disclosure pertains to systems, methods, and computer readable media to improve the operation of imaging systems. In general, techniques are disclosed for capturing stereoscopic images using one or more high color density image sensor (e.g., employing an RGBW color filter array) or full color image sensors (e.g., employing a Bayer color filter array), as well as one or more low color density image sensors (e.g., employing a mostly monochromatic filter array, as will be discussed in more detail below). Low color density image sensors, as described herein, may include substantially fewer color pixels than the low color density image sensor's total number of pixels. In some embodiments, the density of color pixels on a low color density image sensor (i.e., the ratio between the number of color pixels on the image sensor and the total number of pixels on the image sensor) may be greater than approximately 0.03 (i.e., 3%) but less than 0.5 (i.e., 50%). More particularly, the low color density image sensor may be used to capture a mostly-monochrome image that may subsequently be used to reduce the noise and increase the spatial resolution of an imaging system's output image. In addition, the relatively fewer color pixels present in the low color density image sensor may be used to identify and "fill in" colors for regions that are occluded in the image that was captured using the high color density/full color image sensor.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developer's specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of image processing systems having the benefit of this disclosure.

A stereoscopic imaging system as described herein replaces at least one of an imaging system's traditional full color or high color density image sensors (e.g., a sensor using a Bayer color or RGBW filter array) with a low color density (or "sparse color") image sensor. According to some embodiments, the sparse color image sensor includes a plurality of "monochrome pixels" (also referred to herein as "luminance pixels") and a plurality of "color pixels," wherein the monochrome pixels all have common color measurement properties (e.g., they all measure the same wavelengths or wavelengths of light as each other) and make up greater than 50% of the total number of pixels on the sparse color image sensor. In some instances, the percentage of monochrome pixels on the sparse color image sensor may even be much higher than 50% (although less than 100%), as is discussed herein. According to some embodiments, the monochrome pixels are preferably "white pixels," i.e., pixels that have transparent filter elements that allow for sensitivity to all visible colors (e.g., panchromatic pixels). In other instances, however, the monochrome pixels could have a colored filter, so long as they have the same color measurement properties as each other, and the remaining "color pixels" on the image sensor make up a relatively small percentage of the total number of pixels on the image sensor, as discussed herein. According to some embodiments, the color pixels on the sparse color image sensor each have different color measurement properties than the monochrome pixels, and they may include one or more distinct color groups, wherein each group of color pixels has a color filter configured to make the pixels in the respective group sensitive to a particular color of light (e.g., a red group, a blue group, and a green group).

Referring to FIG. 1, for comparison, a full color sensor 100 and a low color density sensor 105, in accordance with this disclosure, are shown side-by-side. Low color density sensor 105 includes individual color pixel groups (e.g., blue pixel 110, green pixel 115 and red pixel 120) surrounded by a large number of monochrome pixels (e.g., 125). In a preferred stereoscopic imaging camera embodiment, the number of color pixels in a full color sensor would be substantially greater than the number of color pixels in a low color density image sensor having the same number of pixels.

Mathematically, color density, as used herein, may be expressed as:

(no. color pixels)/(no. color pixels+no. monochrome pixels).                EQ.1

In one embodiment, the density of color pixels in low color density sensor 105 may be greater than 0.03 (i.e., 3%) but less than 0.5 (i.e., 50%). In another embodiment, the density of color pixels in low color density sensor 105 may be between approximately 0.1 and approximately 0.2 (e.g., in a row pattern implementation, as will be discussed below). In still another embodiment, the density of color pixels in low color density sensor 105 may be between approximately 0.04 and approximately 0.2 (e.g., in a grid pattern or pseudo-random pattern, which will be discussed below).

In operation, low color density sensor 105 would collect more light than a standard or conventional full color image sensor (e.g., using a Bayer color filter array) 100, which would contribute to lower noise in systems using such a sensor in conjunction with a full color image sensor to produce an output image. In addition to lower noise, low color density sensor 105 provides higher spatial resolution image content than image full color sensor 100, and this information may be preserved by avoiding the inconsistencies created by the demosaicing process, in which resolution is reduced in the process of color reconstruction from the color filter array's pattern. As such, a stereoscopic imaging system in accordance with this disclosure may be used to provide a final output image having lower noise and higher spatial resolution than conventional color stereoscopic systems.

Figure 2A:
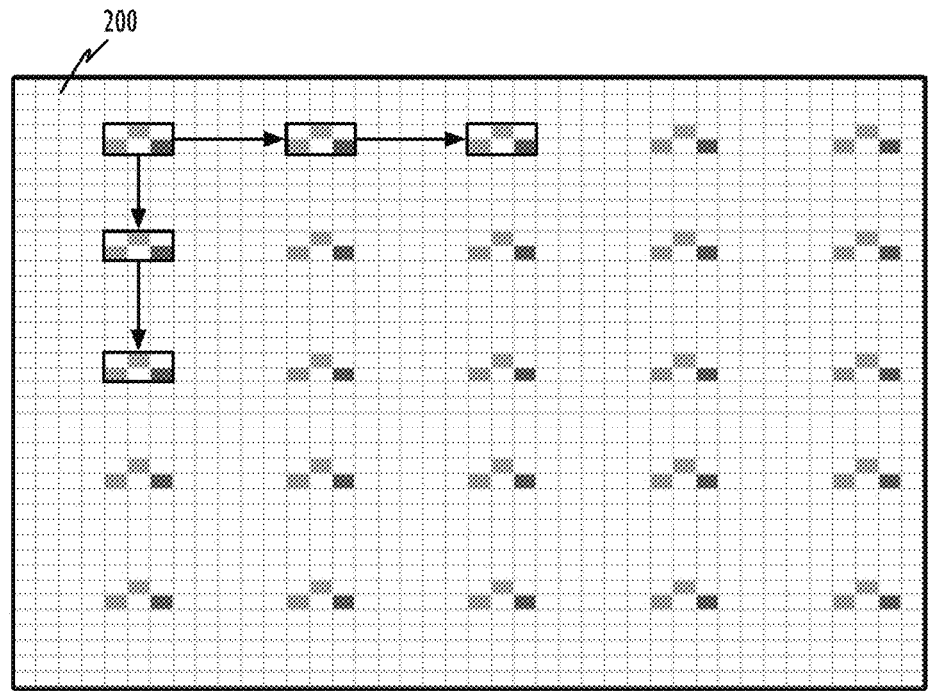
FIGS. 2A-2D show possible color pixel distribution patterns across a low color density sensor, in accordance with one or more embodiments.
Figure 2B:
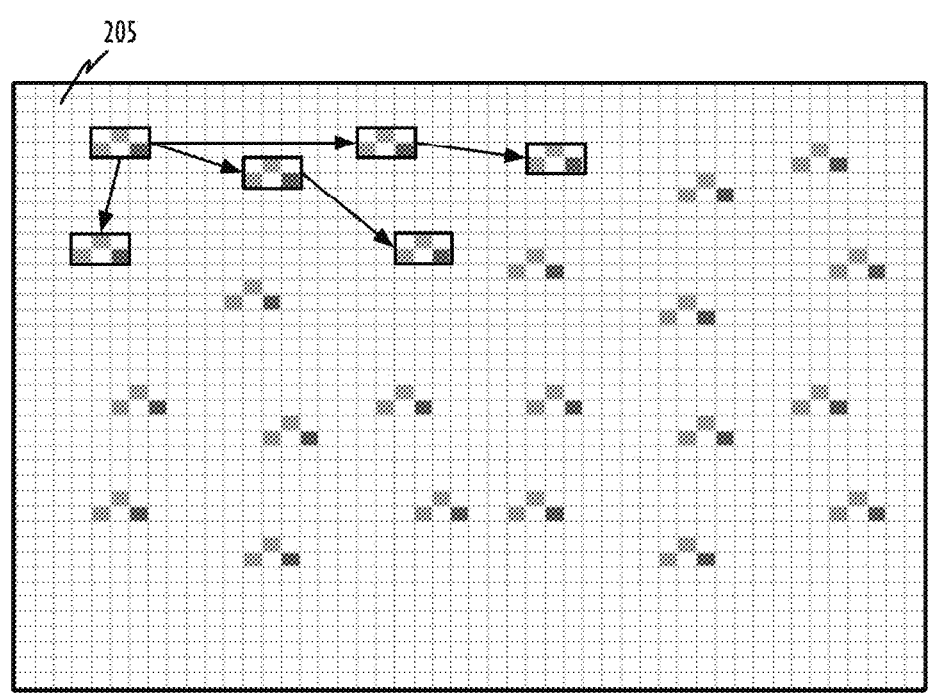

While the pattern of color pixel groups illustrated in FIG. 1 appears very uniform or regular, the number and type of arrangements of color pixel groups in low color density sensor 105 that are possible are numerous. For example, turning to FIGS. 2A-2D, in one embodiment, the pattern of color pixel groups may be distributed regularly, as is shown in low color density sensor 200 of FIG. 2A (see also low color density sensor 105). In another embodiment, the pattern of color pixel groups may be "pseudo-random," as shown in low color density sensor 205 of FIG. 2B. For example, color pixel groups may be randomly distributed in both the horizontal and vertical directions within specified boundaries. While the precise numbers of color pixels may depend on the sensor's resolution and intended system function, for a multi-megapixel sensor such as a 10-20 megapixel sensor, the distance between color pixel groups could be between approximately 20 to approximately 30 pixels and, in some embodiments, between approximately 4 to approximately 8 pixels. For applications that are not particularly concerned with creating the highest possible quality photographic images, the values between color pixel groups may be even higher. In still other embodiments, the shape and/or composition of the color pixel groups themselves may also be pseudo-randomized (i.e., as opposed to the 3-pixel triangular layout of one red, one green, and one blue pixel shown in FIG. 2B). For example, 3-pixel groups in a non-triangular layout, 3-pixel groups with different and/or varying color makeups, or pixel groups with different and/or varying numbers of pixels and layouts all may be used.

Figure 2C:
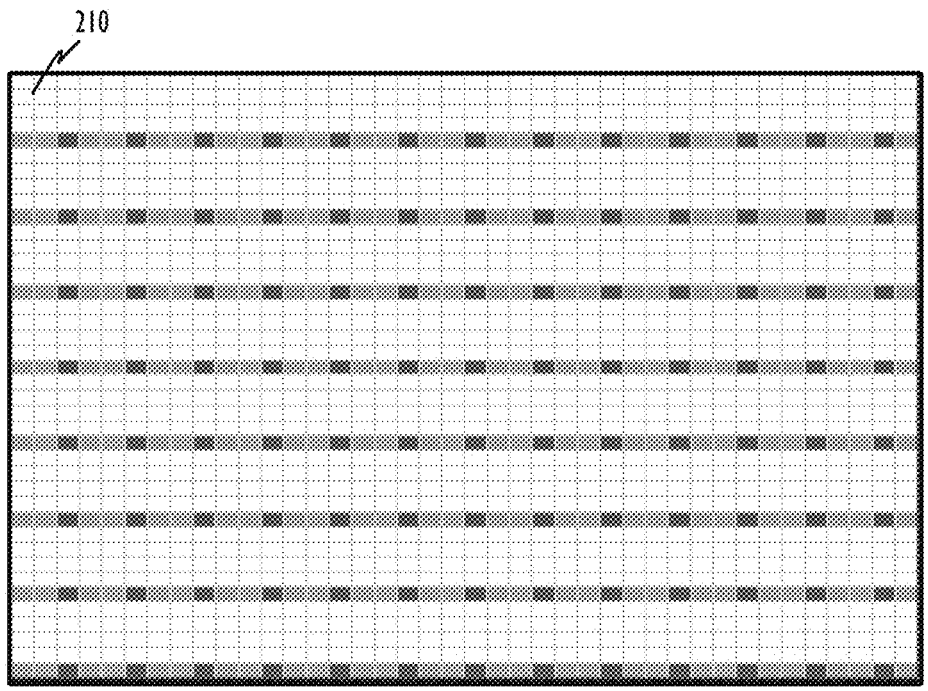

In yet other embodiments, color pixel groups may be arranged into rows, as shown in low color density sensor 210 of FIG. 2C. For example, an image sensor using a row layout may have one (or more) rows of color pixels separated by one (or more) rows of monochrome or non-colorized pixels, such that the only color pixels on the image sensor are located in the aforementioned designated color pixel rows. In some embodiments, the number of non-color rows between color pixel rows may be constant across the image sensor whereas, in other embodiments, the number of non-color rows between each color pixel row may vary across the image sensor. As shown in FIG. 2C, the sequence of color pixels across the rows of color pixels may be a repeated pattern, e.g.: blue, green, red, blue, green, red, etc.

Figure 2D:
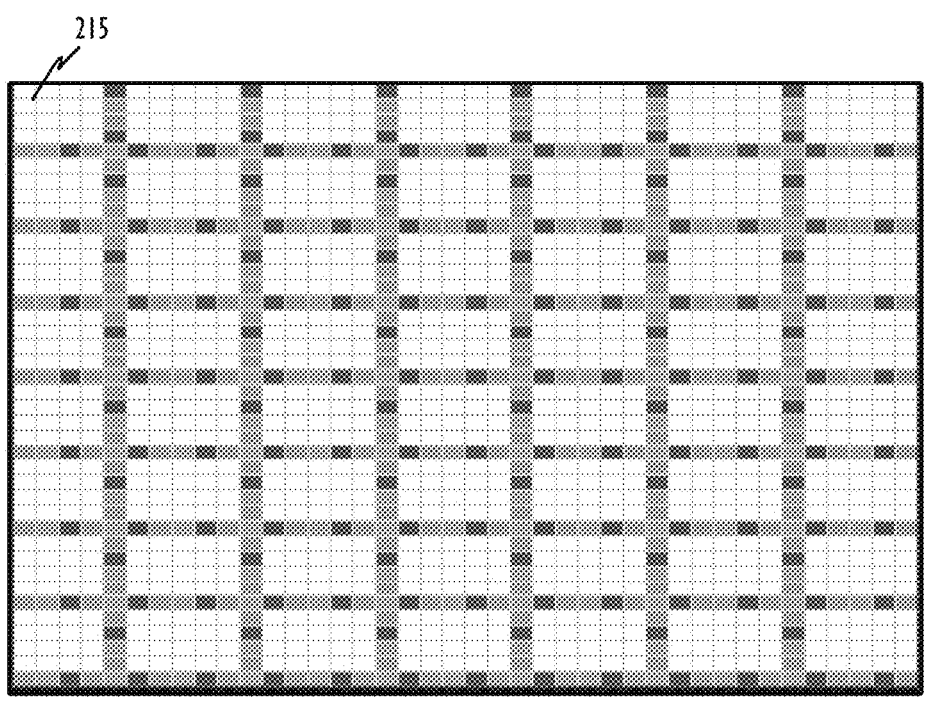

In still other embodiments, color pixel groups may be arranged in a grid pattern, as shown in low color density sensor 215 of FIG. 2D. For example, an image sensor using a grid layout may have one (or more) rows of color pixels separated by one (or more) rows of monochrome or non-colorized pixels and one (or more) columns of color pixels separated by one (or more) columns of monochrome or non-colorized pixels, such that the only color pixels on the image sensor are located in the aforementioned subset of designated color pixel rows and color pixel columns. As mentioned above with reference to FIG. 2C, the number of non-color rows (or columns) between color pixel rows (or columns) may be constant across the image sensor whereas, in other embodiments, the number of non-color rows (or columns) between each color pixel row (or column) may vary across the image sensor.

In some embodiments, the low color density sensor may be designed such that rows including color elements may be exposed for different durations compared to rows that do not contain color elements. This approach may be used to improve the sensor's signal-to-noise (SNR) ratio, while not sacrificing resolution. As a practical matter, the separation between color pixel groups may be chosen such that a balance between the preservation of high frequency spatial detail and color fidelity may be achieved. When the distance between color pixel groups is small, color samples are more dense (thereby improving color fidelity), but spatial resolution information is lost. When the separation between individual color pixel groups is large, spatial resolution may be improved, but color fidelity, especially inside small objects, may be lost. The examples described here are meant solely to be illustrative and not limiting. For example, FIGS. 1 and 2 show only red, green and blue pixels (RGB). Other pixel color formats may also be used such as cyan, green, magenta and yellow (CGMY).

Figure 3A:
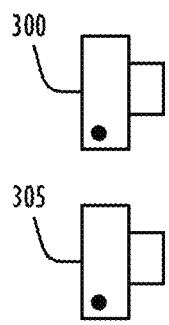
FIGS. 3A-3C show different stereoscopic image capture systems, in accordance with one or more embodiments.
Figure 3B:
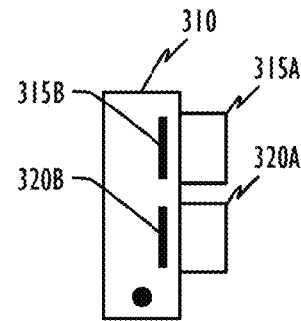
Figure 3C:
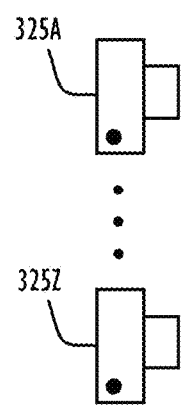

A typical stereoscopic imaging system may include multiple image capture devices configured to capture images simultaneously. Referring to FIGS. 3A-3C, for example, in one embodiment two separate camera units 300 and 305 may be used to capture a stereoscopic image. Camera unit 300 could use a low color density sensor in accordance with this disclosure and camera unit 305 could use a conventional full color image sensor. In another embodiment, a stereoscopic image may be captured using single device 310 that includes two separate image capture units; each having their own lens (315A and 320A) and imaging sensors (315B and 320B). Sensor 315B could be a low color density sensor in accordance with this disclosure and sensor 320B could be a conventional full color image sensor. In still another embodiment, lens units 315A and 320A may guide light onto separate portions of a single sensor element, wherein one portion could be configured as a low color density sensor in accordance with this disclosure and the other could be configured as a conventional full color image sensor (not shown). In still other embodiments, stereoscopic images may be captured using more than two imaging devices or sensors 325A to 325Z, wherein at least one of the multiple devices uses a low color density sensor in accordance with this disclosure. In systems such as that illustrated in FIG. 3C, the different cameras may have different field of views (FOVs), which, although different, may also be at least partially overlapping FOVs.

When capturing images in low light conditions, a longer exposure time allows an image sensor to collect more photons, resulting in a better SNR and higher quality captured images. However, using a longer exposure time during image capture can also result in more blurring in the captured image, e.g., due to the shaking or movement of the hand(s) of the user holding the image capture device during the longer exposure time interval. As mentioned above, an Optical Image Stabilization (OIS) system may be used to combat the effects of increased blurring, e.g., by mechanically moving the lens relative to the image sensor or, vice versa, by moving the image sensor relative to the lens, to compensate for any such motion. However, one drawback is that OIS systems are expensive, involve complex mechanical machinery, and can consume significant power when active.

In cameras such as the stereoscopic imaging systems described herein, e.g., cameras having a high color density (or "full color") image sensor used to capture chrominance and a low color density (or "sparse color") image sensor used to capture both luminance and chrominance, it would be possible to use OIS systems on both, either, or neither of the two image sensors. However, according to some preferred embodiments, OIS is applied only to the sparse color image sensor, i.e., as it captures the reference image that is used to generate the luminance for the fused image. Using OIS on the sparse color camera will assure that, despite any user hand shake or other motion during the relatively longer exposure time used by the sparse color image sensor, the captured image will remain sharp. According to some such preferred embodiments, the use of OIS is avoided on the full color image sensor, which results in decreased costs and power consumption for the overall imaging system, as well as a reduction in any potential magnetic interference that may be created between two nearby OIS systems in the same imaging system.

To compensate for the potential increased blurriness in the images captured by the full color image sensor that does not utilize OIS, according to some embodiments, multiple "short" exposure images (i.e., shorter in duration than the exposure times used concomitantly with the OIS-enabled, sparse color image sensor) may be taken during the relatively "long" exposure time of the sparse color image sensor. For example, in some embodiments, the full color image sensor may take multiple short exposure images (e.g., 3-5 images) during the time period that the sparse color image sensor takes a single long exposure image. The multiple short exposure images from the full color image sensor may then be registered to a reference image (i.e., one of the aforementioned multiple short exposure images) and then merged or fused together (e.g., via a color averaging operation) to achieve better SNR in the registered image captured from the full color image sensor.

In some embodiments, additional "short" exposure images may also be taken by the sparse color image sensor, e.g., before and/or after the capture of the long exposure image. Having these extra images may allow image fusion operations to be subsequently performed on the images captured by the sparse color image sensor, such that, e.g., if an object is moving in the captured scene during the duration of the long exposure, the blurring around the object may be removed, or at least reduced, using additional information captured from one or more of the short exposure images that captured the moving object with less blurring than the long exposure image.

Finally, the OIS-enhanced image captured by the sparse color image sensor and the resulting (e.g., averaged) registered image from the full color image sensor may be merged together to create an enhanced output image, e.g., according to the various techniques and embodiments described herein with reference to FIGS. 4-9.

Figure 4:
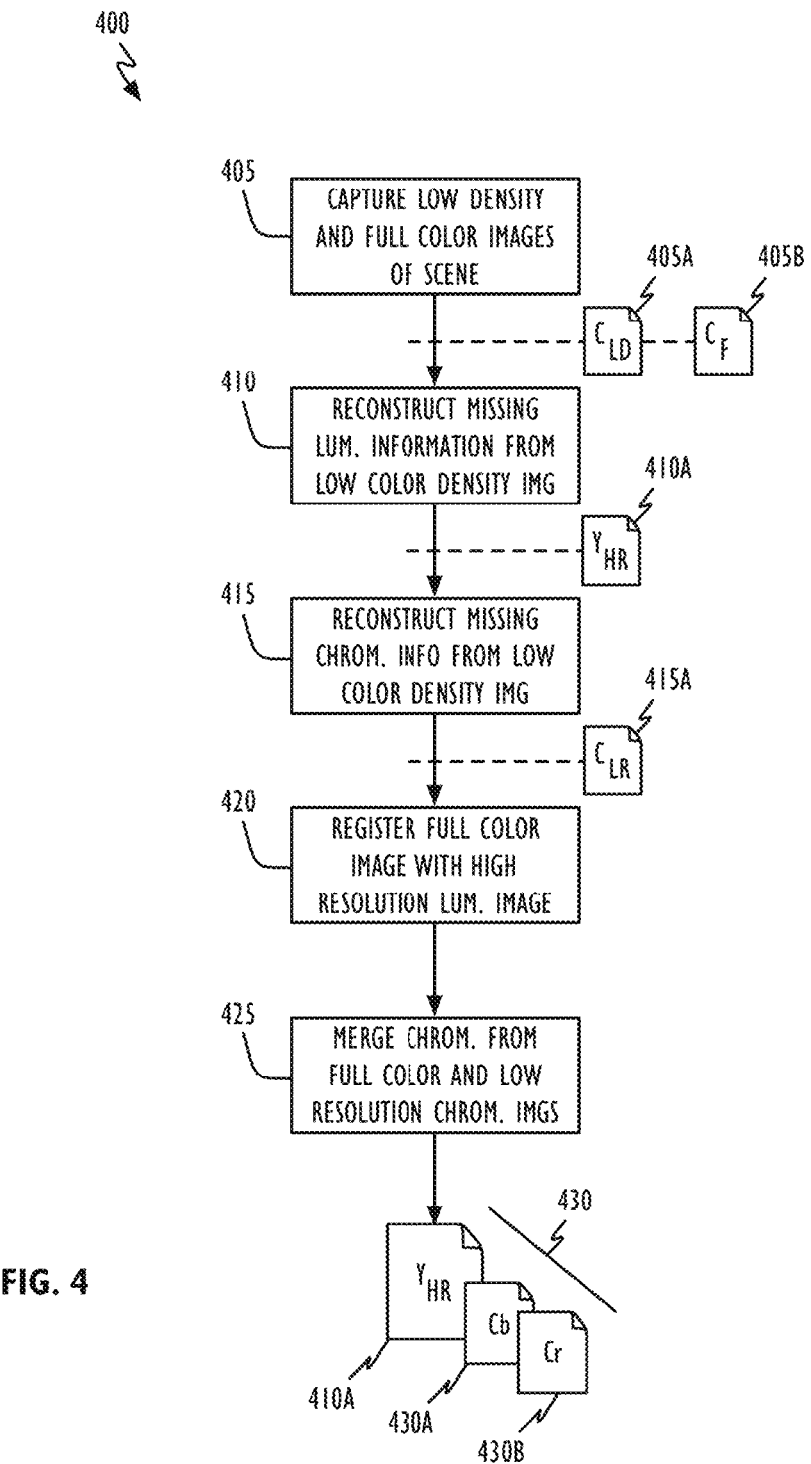
FIG. 4 shows, in flowchart form, a stereoscopic imaging operation, in accordance with one or more embodiments.

Referring to FIG. 4, stereoscopic imaging operation 400, in accordance with one or more embodiments, may begin by capturing at least two images from spatially separated imaging devices or cameras at approximately the same time (block 405); generating low color density image $C_{LD}$ 405A and full color image $C_F$ 405B. Luminance information missing from low color density image $C_{LD}$ 405A may be reconstructed to generate high resolution luminance image $Y_{HR}$ 410A (block 410). Color or chrominance information missing from low color density image $C_{LD}$ 405A may be reconstructed to generate low-resolution color image $C_{LR}$ 415A (block 415). High resolution luminance image $Y_{HR}$ 410A may, as the reference image, be registered (e.g., using a registration circuit) with full color image $C_F$ 405B (block 420), whereafter chrominance information from the low density color image $C_{LD}$ 405A and full color $C_F$ 405B images may be merged (block 425) to create final output image 430. In the illustrated embodiment, output image 430 may include high resolution luminance image $Y_{HR}$ 410A and chrominance images Cb 430A and Cr 430B. In some embodiments, operations in accordance with block 420 may use reconstructed chrominance image $C_{LR}$ 415A instead of high resolution image $Y_{HR}$ 410A.

Figure 5:
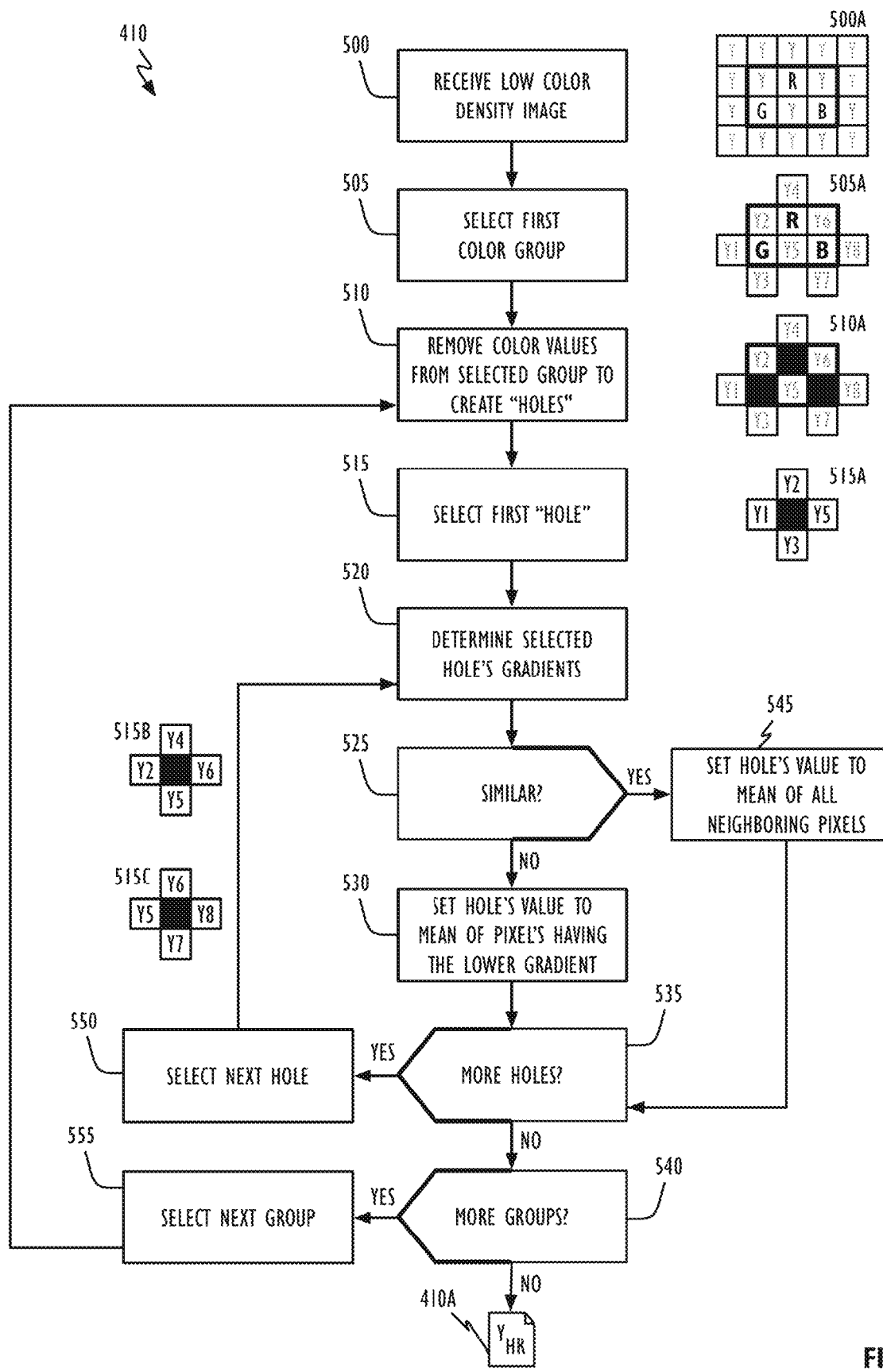
FIG. 5 shows, in flowchart form, a luminance information reconstruction operation, in accordance with one or more embodiments.

Referring to FIG. 5, luminance information reconstruction operation 410 in accordance with one or more embodiments takes, as input, low color density image Co 405A (block 500). Sensor section 500A (e.g., of low color density sensor 105) illustrates the luminance (Y) pixels that surround each group of red (G), green (G) and blue (B) color pixels. From the low color density image $C_{LD}$ 405A, a first group of color pixels 505A may be selected (block 505). From the selected group of pixels, the color pixels may be removed to create holes as illustrated by the black regions in element 510A (block 510). Next, a first one of the holes 515A may be selected (block 515); also shown are a second and third hole 515B and 515C. When a "hole" is selected, so too are the values of the luminance pixels surrounding the hole (e.g., luminance pixels Y1-Y8 as shown in elements 505A, 510A and 515A-515C). Vertical and horizontal gradients may then be determined (block 520):

$$G_V(\text{hole})=G_V(Y_A,Y_B)=|Y_A-Y_B| \qquad \text{EQ. 2A}$$

$$G_H(\text{hole})=G_H(Y_L,Y_R)=|Y_L-Y_R|, \qquad \text{EQ. 2B}$$

where $G_V(X)$ and $G_H(X)$ represent the vertical and horizontal gradients of hole 'X', $Y_A$ represents the value of the luminance pixel immediately above the selected hole, $Y_B$ represents the value of the luminance pixel immediately below the selected hole, $Y_L$ represents the value of the luminance pixel immediately to the left of the selected hole, and $Y_R$ represents the value of the luminance pixel immediately to the right of the selected hole.

If the vertical and horizontal gradients are not similar (the "NO" prong of block 525), the selected hole's luminance value may be set to the average of the pixels having the lowest gradient (block 530). As used herein, "similar" means alike or comparable; the precise value of which will depend upon the specific implementation. In practice, the check at block 525 may be optional and is intended to capture the situation where all of a hole's surrounding luminance values are so close to one another that it is not feasible or useful to distinguish their difference. If all holes in the currently selected group have been processed (the "NO" prong of block 535), a further check may be made to determine if additional color groups from low color density image $C_{LD}$ 405A remain to be processed (block 540). If no more color groups remain to be processed (the "NO" prong of block 540), the high resolution luminance image $Y_{HR}$ 410A has been generated. Returning to block 525, if both the vertical and horizontal gradients of the currently selected hole are similar (the "YES" prong of block 525), the currently selected hole's luminance value may be set to the average of the luminance values of its $Y_A$, $Y_B$, $Y_L$ and $Y_R$ pixels (block 545). In like manner, if at least one hole in the currently selected group remains to be processed (the "YES" prong of block 535), the next hole may be selected (block 550) whereafter operation 410 continues at block 520. Returning to block 540, if there remains at least one group of color pixels in low color density image $C_{LD}$ 405A that has not been processed (the "YES" prong of block 540), a next group may be selected (block 555) whereafter operation 410 continues at block 510.

It should be noted that the specific operations described in connection with FIG. 5 are illustrative only. For example, the gradient need not be used to determine if two (or more) pixel values are similar. In addition, the mean value need not be used to combine two or more pixel values. In this latter case, the maximum value, the minimum value, or the median value could be used. Further, actions in accordance with block 545 could remove the highest and lowest luminance pixel values and determine the mean value of the remaining pixels (or maximum or minimum). One of ordinary skill in the art will understand that these are just example implementations, and that, the best way to reconstruct high resolution luminance image $Y_{HR}$ 410A may depend upon the implementation's desired function.

Figure 6:
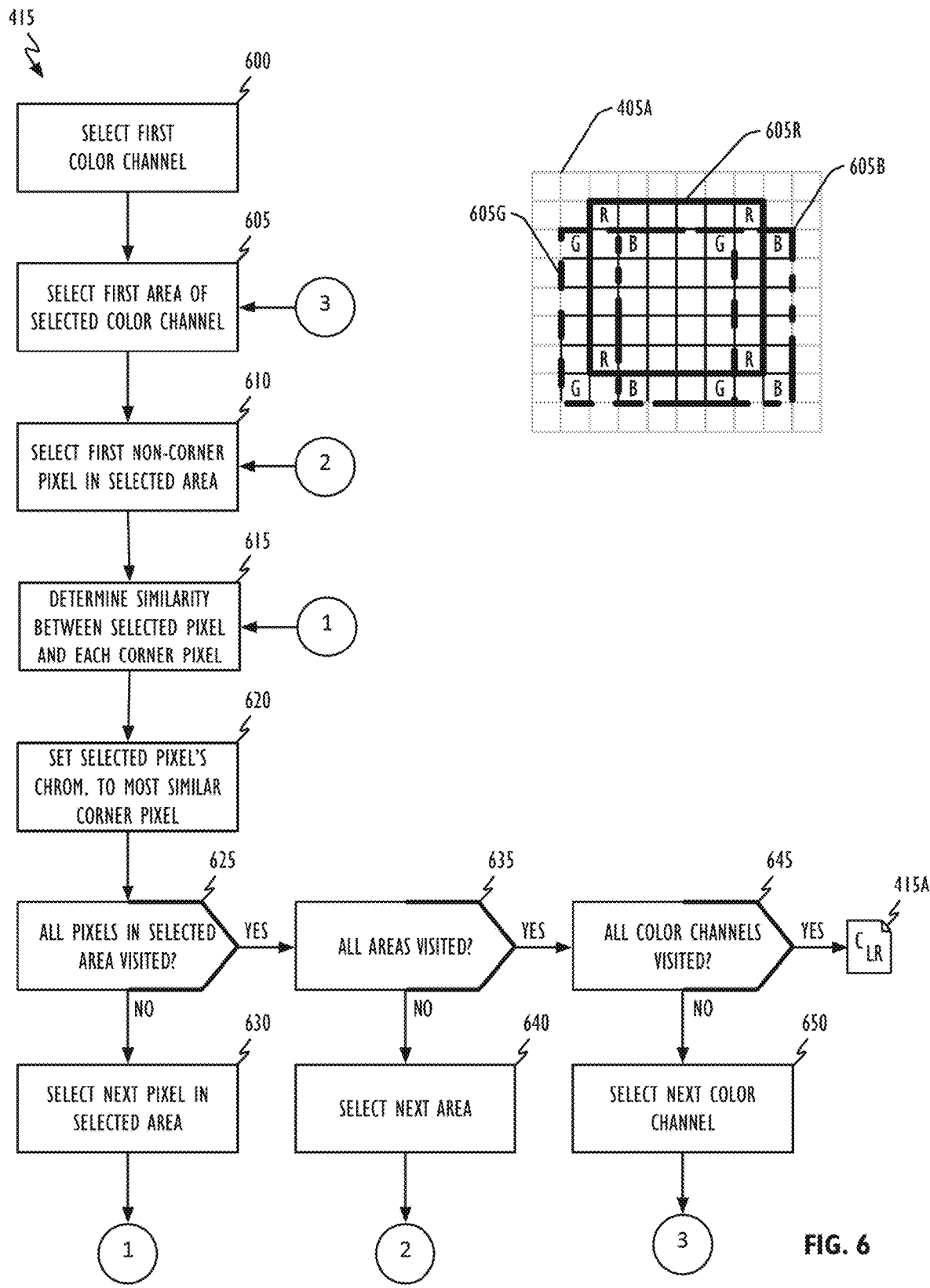
FIG. 6 shows, in flowchart form, a chrominance information reconstruction operation, in accordance with one or more embodiments.

Referring to FIG. 6, chrominance reconstruction operation 415 in accordance with one or more embodiments may operate one channel at a time from low color density image 405A and high resolution luminance image $Y_{HR}$ 410A (block 600). In one embodiment, the red channel may be processed first followed by the green and blue channels. In another embodiment, the Cb channel may be processed first, followed by the Cr channel. Any order or sequence is acceptable. Next, a first area associated with the selected channel may be chosen (block 605); e.g., red channel area 605R or green channel area 605G or blue channel area 605B. As used here, an "area" may be defined as that region of low color density image 405A enclosed by a target pixel's four closest color samples, where the "target" pixel is that pixel whose chrominance value is being reconstructed. A first non-corner target pixel may be chosen (block 610) and a similarity between that pixel and each of the selected area's four corner pixels determined (block 615). In one embodiment, the target pixel's chrominance value may be set to the chrominance value of the most similar corner pixel (block 620). As used here, similarity may be determined in any fashion appropriate to the given implementation. A check may then be made to determine if all of the pixels in the currently selected area have been processed (block 625). If additional pixels remain to be processed in the currently selected area (the "NO" prong of block 625), a next non-corner pixel in the area may be selected (block 630), whereafter chrominance reconstruction operation 415 continues at block 615. If all of the current area's non-corner pixels have been processed (the "YES" prong of block 625), a further check may be made to determine if all of the low color density image's areas have been visited (block 635). If at least one area remains to be processed (the "NO" prong of block 635), the next unprocessed area within low color density image 405A may be selected (block 640), whereafter chrominance reconstruction operation 415 continues at block 610. If all of the low color density image's areas have been visited (the "YES" prong of block 635), a final check may be made to determine if all of the low color density image's channels have been processed (block 645). If at least one channel remains to be processed (the "NO" prong of block 645), a next unprocessed channel may be selected (block 650), whereafter chrominance reconstruction operation 415 continues at block 605. If all of the low color density image's channels have been processed (the "YES" prong of block 645), the low-resolution color image 415A has been generated.

In another embodiment, low color density image $C_{LD}$ 405A may be a composite of multiple low color density images. For example, if multiple low color density images are captured at relatively the same time (e.g., rapidly in time sequence), they may be combined temporally and registered. This newly generated and registered low color density image may then be used in place of the single image discussed before. A benefit of this approach is the resulting image may have improved noise characteristics. This, in turn, can lead to a higher quality low-resolution color image $C_{LR}$ 415A.

Figure 7:
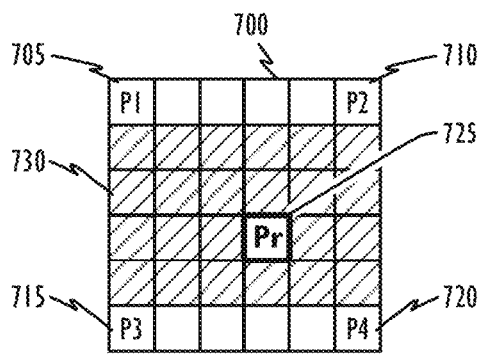
FIG. 7 shows a portion of a low color density sensor, in accordance with one or more embodiments.
Figure 8:
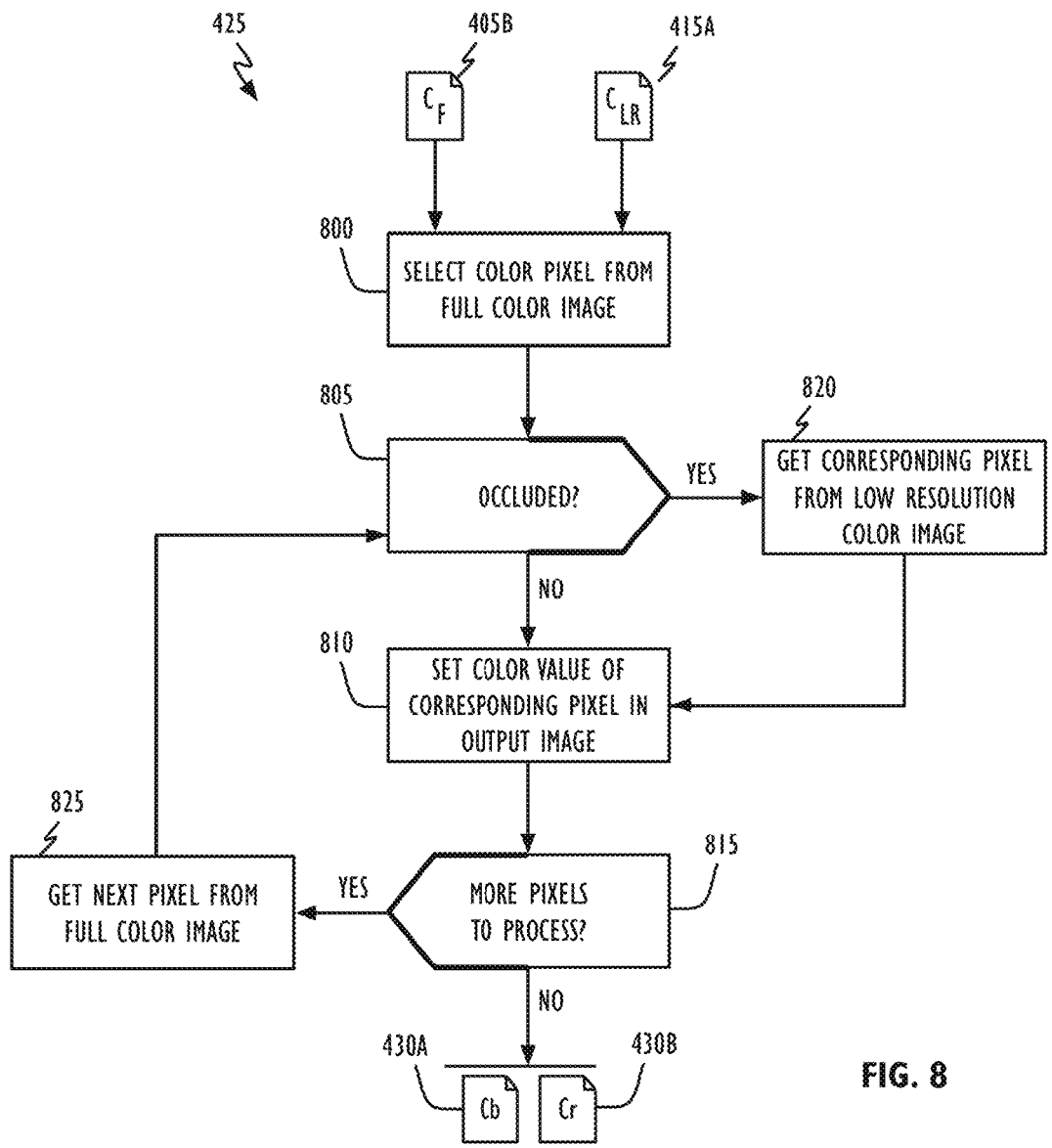
FIG. 8 shows, in flowchart form, a chrominance merge operation, in accordance with one or more embodiments.

A more formal description for one embodiment of chrominance reconstruction operation 415 may be understood with respect to FIG. 7. Let 700 represent an area within low color density image $C_{ID}$ 405A enclosed by chrominance samples P1 705, P2 710, P3 715 and P4 720 where each of P1 705, P2 710, P3 715 and P4 720 represent sample values of a single chrominance modality (e.g., red or Cb). Further, let "i" represent a corner index such that i={1, 2, 3, 4} so that Pi represents a corner pixel. Finally, let Pr 725 represent a pixel whose chrominance value is being reconstructed. Based on this background, Table 1 provides pseudo-code implementing chrominance reconstruction operation 415 for pixel Pr 725.

TABLE 1

Illustrative Chrominance Determination Pseudo-Code

```
Do for each chrominance channel separately (e.g., R, G and B or Cb and Cr):
    Do for each area A (region enclosed by P1, P2, P3 and P4):
        Do for each Pr in A (each pixel in hatch region 730 of area A 700):
            Do for each corner Pi (i = 1 ... 4):
                determine w1 = |Gradient(Pi) - Gradient(Pr)|
                determine w2 = |Luma(Pi) - Luma(Pr)|
                determine max_difference = max(w1, w2)
            do-end
            Assign to Pr the chrominance value of the corner that is most similar to
            it, i.e., with the lowest max_difference value
        do-end
    do-end
do-end
```

In one or more embodiments, the pixels around the image's edges (the "edge pixels") may not be reconstructed. They may, for example, be cropped out and not used during image fusion operations. One way to address this to use a sensor that is slightly larger than is actually needed, or design the sensor such that the corners have color pixels. In one embodiment, Gradient(X) represents the gradient of pixel "X" and may be given by:

$$\text{Gradient}(X) = \sqrt{G_V(X)^2 + G_H(X)^2}, \qquad \text{EQ. 3}$$

where the vertical and horizontal gradients $G_V(X)$ and $G_H(X)$ may use EQS. 2A and 2B. In addition, Luminance(x) represents the luminance value of pixel "x" and is taken from high resolution luminance image 410A, and max( ) returns the maximum value of its arguments. In other embodiments, only one weighted value may be used. By way of example, in the above pseudo-code, w1 may be used by itself (i.e., to the exclusion of w2), since w1 had a larger contribution to the reconstruction quality.

Chrominance merge operation 425, in accordance with one or more embodiments, copies chrominance content from the full color image sensor (i.e., full color image 405B) into most areas of output image 430 (e.g., into 430A and 430B elements), except for those areas that are occluded. Pixels occluded in full color image 405B are reconstructed from low resolution color image 415A. More particularly, and referring to FIG. 8, a first pixel from full color image 405B may be selected (block 800) and checked to see if it corresponds to an object occluded in the full color image (block 805). This could, for example, be based on the local comparison of color and/or luminance information. If it is not (the "NO" prong of block 805), the color or chrominance of the output image's corresponding pixel may be set to the selected pixel's chrominance value (block 810). If no pixels remain to be checked (the "NO" prong of block 815), the output image's color has been established. Returning to block 805, if the pixel selected from full color image 405B corresponds to an occluded object (the "YES" prong of block 805), the pixel from low resolution color image 415A corresponding to the selected pixel from the full color image is instead selected (block 820) and used as the chrominance value for the corresponding output pixel (block 810). Returning now to block 815, if at least one pixel remains to be processed (the "YES" prong of block 815), the next unprocessed pixel from the full color image 405B may be selected (block 825), whereafter chrominance merge operation 425 continues at block 805.

Figure 9:
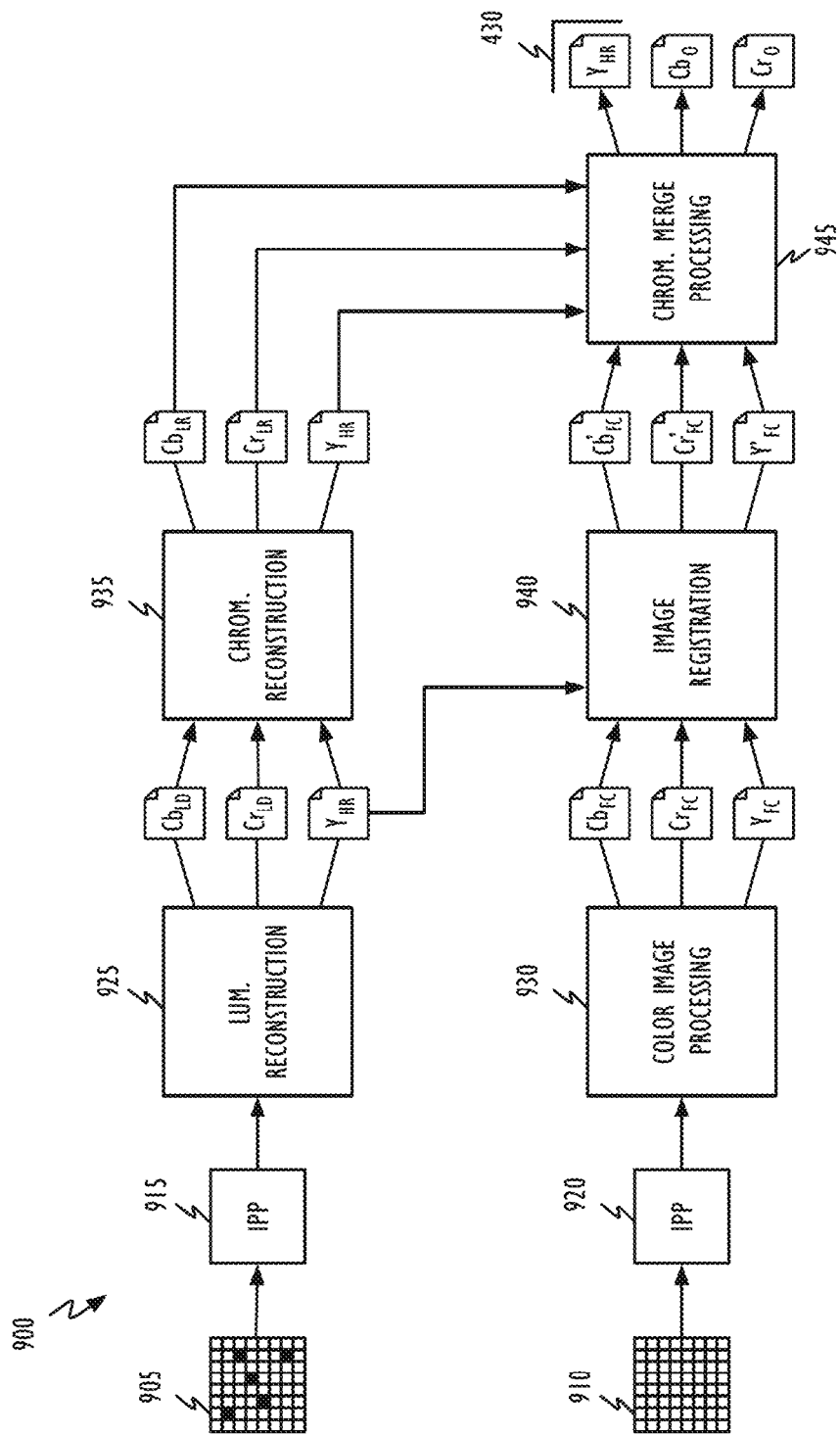
FIG. 9 shows, in block diagram form, a stereoscopic imaging system, in accordance with one or more embodiments.

Referring to FIG. 9, stereoscopic imaging system 900 in accordance with one or more embodiments may include low density color image sensor 905 (see FIGS. 1 and 2), full color image sensor 910 (see FIG. 1), image processing pipelines (IPPs) 915 and 920, luminance reconstruction circuit or module 925, color image processing circuit or module 930, chrominance reconstruction circuit or module 935, image registration circuit or module 940, and chrominance merge circuit (or output circuit) 945. Image sensors 905 and 910 may be as described above and may be constructed in any fashion and use any available technology. For example, image sensors 905 and 910 may be CCD (charge-coupled device) or CMOS (complementary metal-oxide semiconductor) imagers.

In some embodiments, one or both of image sensors 905 and 910 may be fully populated with pixels using split photodiodes. According to some embodiments of split photodiode pixels, each such pixel may be split into multiple parts, e.g., two parts, such as the left half of the pixel and the right half of the pixel. Each individual part of the split photodiode pixel may then be read out separately by the image sensor, e.g., treating each half of the split photodiode pixel as if it was its own pixel. According to some such embodiments, the micro lens array covering the image sensor may be the same as is used on an image sensor of non-split photodiode pixels, i.e., there is not a separate microlens for each "half" pixel; rather, the same microlens covers both halves of each split photodiode pixel. The result of such a setup is that each half of the split photodiode pixel gathers light coming in through half of the camera aperture (e.g., the left half of the split photodiode pixels gather light coming in through left side of the aperture, and the right half of the split photodiode pixels gather light coming in through right side of the aperture). Due to the physical separation of the two halves of each split photodiode pixel, the two captured "half" images (e.g., the "left-half" image and the "right-half" image) will demonstrate small disparity, just as a normal stereoscopic camera would. If the disparities between the two half images are calculated, they may then be translated in to depth information (relative to the current focus setting of the camera), as can be done with a normal stereoscopic camera.

In cameras such as the stereoscopic imaging systems described herein, it would be possible to use split photodiode pixels on both, either, or neither of the two image sensors (i.e., the full color image sensor and the sparse color image sensor). However, according to some preferred embodiments, including split photodiode pixels on only the sparse color image sensor would still perform better than also including split photodiode pixels on the full color image sensor, due to the lack of color filters on the majority of the pixels on the sparse color image sensor. This allows the sparse color image sensor to use split photodiode pixels for better auto focusing in low-light environments than could be achieved using a normal color image sensor. In such embodiments, wherein only the sparse color image sensor has split photodiode pixels (e.g., on every pixel), the other camera, i.e., the camera having the full color image sensor could have no split photodiode pixels, instead performing its auto focus operations using the information gathered by the sparse color image sensor that uses the split photodiode pixels. Among the potential advantages of such a setup and operational mode is that it may provide increased power savings, while still allowing auto focus operations to perform well in low light environments.

While not necessary, each image sensor 905 and 910 is shown coupled to its own IPP. IPPs 915 and 920 may perform a number of different tasks that can include, but not be limited to, black level removal, de-noising, lens shading correction, white balance adjustment, demosaic operations, and the application of local or global tone curves or maps. If IPP 920 performs demosaic operations, color image processing circuit or module 930 may not be needed. In general, IPPs 915 and 920 may comprise custom designed integrated circuits, programmable gate-arrays, central processing units (CPUs), graphical processing units (GPUs), memory, or a combination of these elements (including more than one of any given element). Some functions provided by IPPs 905 and 910 may be implemented at least in part via software (including firmware). Luminance reconstruction circuit or module 925 (which may be implemented as hardware, firmware, software or a combination of these) is designed to perform the functions discussed above with respect to block 410 in FIG. 4 and all of FIG. 5. Chrominance reconstruction circuit or module 935 (which may also be implemented as hardware, firmware, software or a combination thereof) is designed to perform the functions discussed above with respect to block 415 in FIG. 4 and all of FIG. 6. Image registration circuit or module 940 may be designed to register the high resolution luminance image $Y_{HR}$ 410A and full color image $C_F$405B using luminance image $Y_{HR}$ 410A as the reference image (see discussion above with respect to block 420 of FIG. 4). As noted above, image registration operations in accordance with circuit or module 940 may use reconstructed chrominance images $Cb_{LD}$ and $Cr_{LD}$ instead of high resolution image $Y_{HR}$. Finally, chrominance merge circuit or module 945 may be designed to perform the functions described above with respect to block 425 of FIG. 4 and all of FIG. 8. As with the other elements of imaging system 900, image registration circuit or module 940 and chrominance merge circuit or module 945 may be implemented as hardware, firmware, software or a combination thereof.

Figure 10:
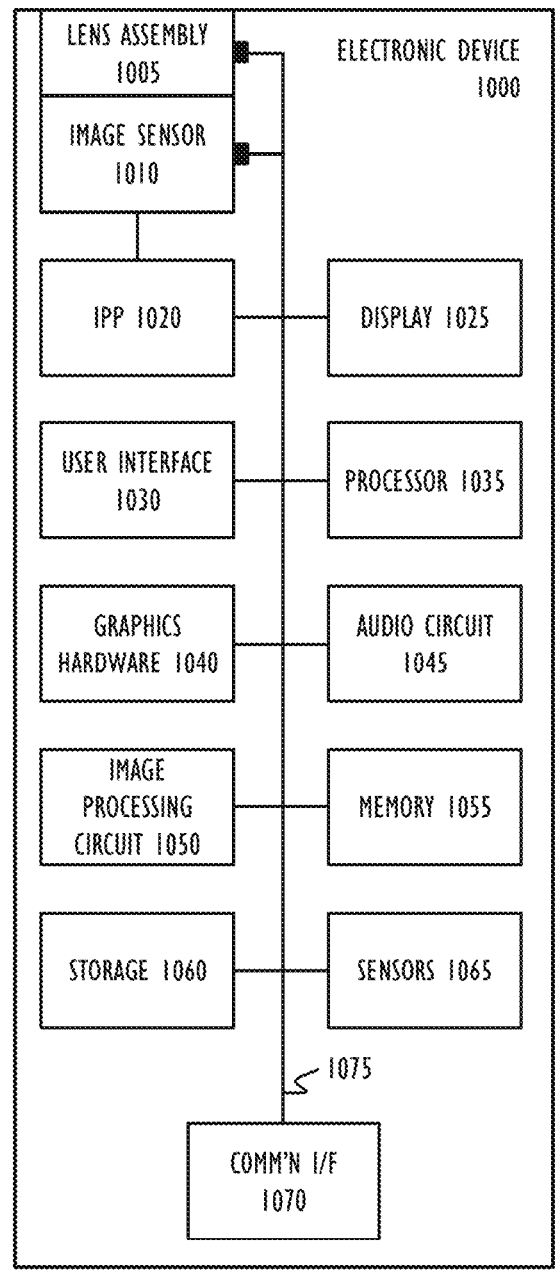
FIG. 10 shows, in block diagram form, a multi-function electronic device, in accordance with one or more embodiments.

Referring to FIG. 10, a simplified functional block diagram of illustrative electronic device 1000 is shown according to one embodiment. Electronic device 1000 may be used to acquire, generate or display digital images (including stereoscopic images) in accordance with this disclosure. Electronic device 1000 could be, for example, a mobile telephone, personal media device, a notebook computer system, or a tablet computer system. As shown, electronic device 1000 may include lens assembly 1005 and image sensor 1010 for capturing images of a scene. In addition, electronic device 1000 may include image processing pipeline (IPP) 1015, display element 1020, user interface 1025, processor(s) 1030, graphics hardware 1035, audio circuit 1040, image processing circuit 1045, memory 1050, storage 1055, sensors 1060, communication interface 1065, and communication network or fabric 1070.

Lens assembly 1005 may include a single lens or multiple lens, filters, and a physical housing unit (e.g., a barrel). One function of lens assembly 1005 is to focus light from a scene onto image sensor 1010. In accordance with this disclosure, lens assembly 1005 includes at least two separate lens units and image sensor 1010 at least two separate sensors (low density color image sensor 105 or 905 and full color image sensor 100 or 910). IPP 1015 may perform as discussed above with respect to IPPs 915 and 920. Alternatively, IPP 1015 could be used instead of two IPPs as discussed above. Display element 1020 may be used to display text and graphic output as well as receiving user input via user interface 1025. For example, display element 1020 may be a touch-sensitive display screen. User interface 1025 can also take a variety of other forms such as a button, keypad, dial, a click wheel, and keyboard. Processor 1030 may be a system-on-chip (SOC) such as those found in mobile devices and include one or more dedicated CPUs and one or more GPUs. Processor 1030 may be based on reduced instruction-set computer (RISC) or complex instruction-set computer (CISC) architectures or any other suitable architecture and each computing unit may include one or more processing cores. Processor 1030 may also be used to perform some or all of the tasks described above with respect to blocks 925 and 935-945. Graphics hardware 1035 may be special purpose computational hardware for processing graphics and/or assisting processor 1030 perform computational tasks. In one embodiment, graphics hardware 1035 may include one or more programmable GPUs each of which may have one or more cores. Audio circuit 1040 may include one or more microphones, one or more speakers and one or more audio codecs. Image processing circuit 1045 may aid in the capture of still and video images from image sensor 1010 and include at least one video codec. Image processing circuit 1045 may work in concert with IPP 1015, processor 1030 and/or graphics hardware 1035. Images, once captured, may be stored in memory 1050 and/or storage 1055. Memory 1050 may include one or more different types of media used by IPP 1015, processor 1030, graphics hardware 1035, audio circuit 1040, and image processing circuitry 1045 to perform device functions. For example, memory 1050 may include memory cache, read-only memory (ROM), and/or random access memory (RAM). Storage 1055 may store media (e.g., audio, image and video files), computer program instructions or software, preference information, device profile information, and any other suitable data. Storage 1055 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Device sensors 1060 may include, but need not be limited to, an optical activity sensor, an optical sensor array, an accelerometer, a sound sensor, a barometric sensor, a proximity sensor, an ambient light sensor, a vibration sensor, a gyroscopic sensor, a compass, a barometer, a magnetometer, a thermistor sensor, an electrostatic sensor, a temperature sensor, a heat sensor, a thermometer, a light sensor, a differential light sensor, an opacity sensor, a scattering light sensor, a diffractional sensor, a refraction sensor, a reflection sensor, a polarization sensor, a phase sensor, a florescence sensor, a phosphorescence sensor, a pixel array, a micro pixel array, a rotation sensor, a velocity sensor, an inclinometer, a pyranometer and a momentum sensor. Communication interface 1065 may be used to connect device 1000 to one or more networks. Illustrative networks include, but are not limited to, a local network such as a universal serial bus (USB) network, an organization's local area network, and a wide area network such as the Internet. Communication interface 1065 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). Communication network or fabric 1070 may be comprised of one or more continuous (as shown) or discontinuous communication links and be formed as a bus network, a communication network, or a fabric comprised of one or more switching devices (e.g., a cross-bar switch).

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). For example, output from luminance reconstruction circuit or module may be filtered to remove outliers. Similarly, output from chrominance reconstruction circuit or module 935 may be filtered to remove outliers. In light of these caveats, the scope of the invention should therefore be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A stereoscopic imaging system, comprising:
    a first image sensor configured to capture a first color image of a scene, wherein the first color image sensor includes color pixels having color values;
    a second image sensor configured in a predetermined spatial relationship to the first image sensor, so as to form a stereoscopic imaging system, wherein the second image sensor is configured to capture, concomitantly with the first color image, a second image of the scene, wherein the second image sensor includes luminance pixels having luminance values and color pixels having color values, and wherein the first image sensor has a greater number of color pixels than the second image sensor;
    a color reconstruction circuit configured to generate, using information from the second image, a second color image; and
    an output circuit configured to generate, using information from the first and second color images, an output image,
    wherein split photodiode pixels are used on the second image sensor, but not the first image sensor.

2. The stereoscopic imaging system of claim 1, wherein the number of color pixels on the second image sensor comprises less than 50% of the total number of pixels on the second image sensor.

3. The stereoscopic imaging system of claim 2, wherein the number of color pixels on the second image sensor further comprises greater than 3% of the total number of pixels on the second image sensor.

4. The stereoscopic imaging system of claim 1, wherein the color pixels of the second image sensor are arranged in at least one of: a regular pattern, a pseudo-random pattern, a row pattern, or a grid pattern.

5. The stereoscopic imaging system of claim 1, wherein an optical image stabilization (OIS) system is used on the second image sensor, but not the first image sensor.

6. The stereoscopic imaging system of claim 1, wherein the second image sensor is further configured to capture the second image of the scene by:
    exposing first rows of sensor elements of the second image sensor for a first duration; and
    exposing second rows of sensor elements of the second image sensor for a second duration different than the first duration.

7. The stereoscopic imaging system of claim 1, further comprising a luminance reconstruction circuit configured to generate a luminance image using information from the second image.

8. The stereoscopic imaging system of claim 7, further comprising a registration circuit configured to generate a registered color image using information from the first image and the luminance image.

9. The stereoscopic imaging system of claim 8, wherein the output circuit is configured to merge the registered color image and the second color image to generate the output image.

10. The stereoscopic imaging system of claim 1, wherein the stereoscopic imaging system is configured to perform auto focus operations using information captured by the first image sensor but not information captured by the second image sensor.

11. An image processing method, comprising:
    capturing, using a first image sensor, a first color image of a scene, the first color image including color pixels having color values;
    capturing, using a second image sensor configured in a predetermined spatial relationship to the first image sensor, a second image of the scene, wherein the second image sensor is configured to capture the second image of the scene concomitantly with the first color image, wherein the second image sensor includes luminance pixels having luminance values and color pixels having color values, and wherein the first image sensor has a greater number of color pixels than the second image sensor;
    generating, using a color reconstruction circuit, a second color image based, at least in part, on the second image;
    generating, using a luminance reconstruction circuit, a luminance image based, at least in part, on the second image;
    generating, using a registration circuit, a registered color image based, at least in part, on the first image and the luminance image; and
    merging, using the output circuit, the registered color image and the second color image to generate an output image.

12. The method of claim 11, wherein the number of color pixels on the second image sensor comprises less than 50% of the total number of pixels on the second image sensor.

13. The method of claim 12, wherein the number of color pixels on the second image sensor further comprises greater than 3% of the total number of pixels on the second image sensor.

14. The method of claim 13, wherein the color pixels of the second image sensor are arranged in at least one of: a regular pattern, a pseudo-random pattern, a row pattern, or a grid pattern.

15. The method of claim 11, wherein capturing the second image of the scene further comprises:
 exposing first rows of sensor elements of the second image sensor for a first duration; and
 exposing second rows of sensor elements of the second image sensor for a second duration,
 wherein the first rows comprise rows of sensor elements that include both color elements and luminance elements, and
 wherein the second rows comprise only luminance elements.

16. An imaging system, comprising:
 a first image sensor, comprising:
  a first plurality of luminance pixel elements; and
  a second plurality of color pixel elements,
  wherein a number of the second plurality of color pixel elements comprises less than 50% of a sum of a number of the first plurality of luminance pixel elements and the number of the second plurality of color pixel elements, and
  wherein the second plurality of color pixel elements are arranged in a predetermined pattern on the image sensor; and
 a second image sensor, comprising:
  a third plurality of color pixel elements,
  wherein a number of the third plurality of color pixel elements is greater than the number of the second plurality of color pixel elements, and wherein the imaging system is configured to combine image information captured concomitantly by the first image sensor and the second image sensor to generate an output image, and wherein split photodiode pixels are used on the first image sensor, but not the second image sensor.

17. The imaging system of claim 16, wherein an optical image stabilization system is used on the first image sensor, but not the second image sensor.

18. The imaging system of claim 16, wherein the imaging system is configured to perform auto focus operations using information captured by the first image sensor but not information captured by the second image sensor.

19. The imaging system of claim 16, further comprising:
 a luminance reconstruction circuit configured to generate a luminance image using information captured by the first image sensor.

20. The imaging system of claim 19, further comprising:
 a registration circuit configured to generate a registered color image using information captured by the second image sensor and the luminance image,
 wherein generating the output image further comprises merging the registered color image and the information captured using the first image sensor.

* * * * *